Dec. 13, 1932.  G. S. FLANDERS ET AL  1,890,536
FLOW BEAN
Filed Jan. 10, 1930
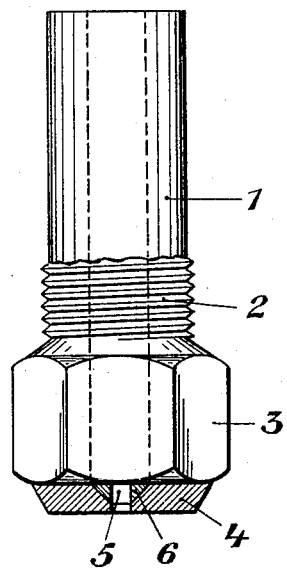
INVENTORS
George S. Flanders, and
Mervyn Aleck ap Rhys Pryce
BY
Langner, Parry, Card & Langner
ATTORNEYS Patented Dec. 13, 1932

1,890,536

UNITED STATES PATENT OFFICE

GEORGE SPENCER FLANDERS AND MERVYN ALECK AP RHYS PRYCE, OF MARACAIBO, VENEZUELA, ASSIGNORS TO NAAMLOOZE VENNOOTSCHAP DE BATAAFSCHE PETROLEUM MAATSCHAPPIJ, OF THE HAGUE, NETHERLANDS

FLOW BEAN

Application filed January 10, 1930, Serial No. 419,919½, and in the Netherlands January 16, 1929.

The invention relates to a method and a device for regulating the flow speed of liquids in piping and suchlike.

It is known that for this purpose, e. g. in petroleum production, so-called flow beans are used, which in principle, consist of a short length of piping of smaller diameter than that of the main piping in which it is fixed preferably by screwing tight. As these beans are naturally subject to great wear and tear, they are made easily accessible and interchangeable.

The present invention now relates to a method and device which reduces the wear and tear to a minimum. It is based on the view that if a thin, perforated plate is used as a flow bean, no cutting effect can occur from the liquids nor from the solid substances such as the sand carried along in crude oil.

The method according to the invention thus consists in that for regulating the flow speed of liquids in tubings and such like, a perforated plate is fitted at any suitable point in the system through which the liquid flows. It is thereby of primary importance that the perforation is true-centred in relation to the pipe in which the plate is fitted.

The device according to the invention consists in principle of a tube suitable for conducting liquids, viz. the known tubes which are used in the transporting of the crude oil from the head of a well, which is provided with a perforated plate, the thickness of which is not greater than required for safely withstanding the liquid pressure tending to deform or destroy the plate. The plate can be made in its entirety of any suitable hard material, such as of metal such as high speed tool steel, or of a plate made from a suitable, though softer material faced at the perforation with hard material. For practical reasons as for the sake of easy interchangeability, the plate can be fitted in or on a short tubing length, or in a bean already known. Preferably the plate is welded on. The dimensions of the perforation are in any case taken as that which is necessary with a view to the required flow-speed in the pipe system. This can be ascertained by experiment. In case the plate is fitted on, or in a bean, the latter simply acts as a sort of expansion chamber, whilst the plate acts as a flow bean.

The figure shows in elevation and partial cross section a flow bean according to our invention.

A suitable execution of a bean according to the invention is illustrated in the attached drawing. It represents an auxiliary tube 1 which can be screwed tight in the main tubing not shown by means of screw threads 2 and nut 3. At the place where the liquid flow enters the auxiliary tube 1, the diaphragm shaped bushing 4 is fastened to nut 3, preferably welded on. This contains perforation 5, which is lined with a ring shaped facing 6 of a wear resisting material, such as high speed tool steel. The perforation 5 is true centred in relation to the bore of the auxiliary tube; the slightest deviation either in shape or location of the perforation in relation to the centre line of the bore, will produce considerable wear at this spot and can result in cutting through the tubing wall.

The facing 6 is placed at the outflow side of the plate because here erosion occurs first. This may be accounted for by the fact that the fluid-jet entering the opening of the plate is contracted and during the passage therethrough gradually increases in diameter. Consequently at the entry side a ring-shaped zone of inert fluid protects the walls of the opening against erosion, which if at all, will take place only where the fluid-jet again touches the wall of the opening, i. e. at the exit side. Even, if, through prolonged use, the inflow face of the plate should be eroded, the facing would not be blown out of position, said facing being fixedly connected to the plate. Further it is not necessary to use a plate having a facing since the plate can be made entirely of a suitable hard material. In practice both constructions have proved to be of great value and capable of resisting erosion much longer than the usual flow beans provided with a long channel.

What we claim is:

1. Flow bean for regulating oil wells comprising a short length of pipe with a cylindrical axial passage and provided with external thread, and a thin perforated substantially flat plate fastened to the face of the pipe at the entry side thereof with its perforation coaxial with the passage of the pipe, the diameter of said perforation being substantially smaller than the diameter of said passage, so as to form a restricted throat.

2. A flow bean according to claim 1, in which the flat plate is provided with an annular piece of wear-resisting material surrounding the perforation of the said plate.

In testimony whereof we have signed our names to this specification.

GEORGE S. FLANDERS.
MERVYN A. ap RHYS PRYCE.